US012682368B2

(12) United States Patent
Waishampayan et al.

(10) Patent No.: US 12,682,368 B2
(45) Date of Patent: Jul. 14, 2026

(54) SCALABLE HOUSEHOLD TRANSACTION INGESTION SYSTEM AND METHOD

(71) Applicant: FullThrottle Technologies, LLC, West Chester, PA (US)

(72) Inventors: Amol Waishampayan, Philadelphia, PA (US); Pat O'Flaherty, Dublin (IE); Abdullah Al-sohel, Denton, TX (US)

(73) Assignee: FullThrottle Technologies, LLC, West Chester, PA (US)

( * ) Notice: Subject to any disclaimer, the term of this patent is extended or adjusted under 35 U.S.C. 154(b) by 0 days.

(21) Appl. No.: 18/952,375

(22) Filed: Nov. 19, 2024

(65) Prior Publication Data

US 2026/0141415 A1      May 21, 2026

(51) Int. Cl.
*G06Q 30/0204*      (2023.01)
*G06F 21/62*      (2013.01)
*H04W 64/00*      (2009.01)

(52) U.S. Cl.
CPC ..... *G06Q 30/0205* (2013.01); *G06F 21/6254* (2013.01); *H04W 64/003* (2013.01)

(58) Field of Classification Search
CPC ............. G06Q 30/0205; H04W 64/003; G06F 21/6254
See application file for complete search history.

(56) References Cited

U.S. PATENT DOCUMENTS

| | | | | |
|---|---|---|---|---|
| 8,792,909 B1 * | 7/2014 | Xu | G06Q 30/0261 455/456.1 |
| 8,935,797 B1 | 1/2015 | Silver et al. | |

| | | | | |
|---|---|---|---|---|
| 9,721,214 B1 * | 8/2017 | Corrado | G06N 7/08 |
| 10,455,362 B1 * | 10/2019 | Meissner | H04W 4/029 |
| 11,477,531 B1 * | 10/2022 | Ur | H04N 21/4667 |
| 2010/0161492 A1 * | 6/2010 | Harvey | G06Q 30/0246 705/50 |
| 2010/0212716 A1 | 8/2010 | Lerner et al. | |
| 2010/0323716 A1 | 12/2010 | Jaffri | |

(Continued)

OTHER PUBLICATIONS

Inferring household size distribution and its association with the built environment using massive mobile phone data; Lai et al; Mar. 2023 (Year: 2023).*

(Continued)

*Primary Examiner* — Deirdre D Hatcher
(74) *Attorney, Agent, or Firm* — Flaster Greenberg P.C.

(57)      ABSTRACT

Systems, methods, and apparatus are described herein for scalable household transaction ingestion. A method of scalable household transaction ingestion may include receiving first transaction data associated with a first transaction performed via a first browser session initialized by a first user via a first browser on a first user computing device. The method may include determining a first address of a first household of the first user based on the first latitude coordinate and the first longitude coordinate using a map application programming interface (API). The method may include determining first resident density data for the first household at the determined first address based on the first transaction data. The method may include anonymizing the first resident density data to remove any personally identifiable information (PII). The method may include preprocessing the first transaction data and the first resident density data for analysis.

16 Claims, 10 Drawing Sheets

(56)                    References Cited

U.S. PATENT DOCUMENTS

| | | | |
|---|---|---|---|
| 2013/0151645 | A1 | 6/2013 | Siliski et al. |
| 2014/0143655 | A1 | 5/2014 | Alon et al. |
| 2015/0235275 | A1* | 8/2015 | Shah .................. G06Q 30/0269 705/14.66 |
| 2017/0064032 | A1 | 3/2017 | Ulrich et al. |
| 2018/0332140 | A1* | 11/2018 | Bullock .................. H04L 67/53 |
| 2019/0199774 | A1 | 6/2019 | Demsey et al. |
| 2020/0233911 | A1 | 7/2020 | Siroker et al. |
| 2020/0386565 | A1 | 12/2020 | Rao et al. |
| 2021/0241345 | A1* | 8/2021 | Iyer .................... G06Q 30/0641 |
| 2022/0215948 | A1* | 7/2022 | Bardot ................... G16H 40/40 |
| 2022/0391933 | A1* | 12/2022 | Waishampayan ....... H04L 67/02 |
| 2024/0422075 | A1* | 12/2024 | Knight .................. H04W 4/029 |

OTHER PUBLICATIONS

Learn how the Safari web browser protects your privacy, Safari Privacy Overview, (available at https://www.apple.com/safari/docs/Safari_White_Paper_Nov_2019.pdf), Nov. 2019, 12 pages.
Defendant's Brief in Support of Motion to Dismiss filed by Rocket Media, LLC, *Fullthrottle Technologies, LLC* v. *Rocket Media, LLC*, Northern District of North Carolina, Sep. 6, 2024, 36 pages.
*Fullthrottle Technologies, LLC* v. *Rocket Media*, US District Court, Northern District of North Carolina, First Amended Complaint filed by Fullthrottle Technologies, LLC, Aug. 7, 2024, 117 Pages.
Motion to Dismiss filed by Rocket Media, LLC, *Fullthrottle Technologies, LLC* v. *Rocket Media, LLC*, US District Court, Northern District of North Carolina, Sep. 6, 2024, 2 pages.
Reply to Response in Opposition to Motion to Dismiss filed by Rocket Media, LLC, *Fullthrottle Technologies, LLC* v. *Rocket Media, LLC*, US District Court, Northern District of North Carolina, Oct. 18, 2024, 20 Pages.
Response In Opposition to Motion to Dismiss filed by Fullthrottle Technologies, LLC, *Fullthrottle Technologies, LLC* v. *Rocket Media, LLC*, US District Court, Northern District of North Carolina, Sep. 27, 2024, 43 Pages.
Petition for IPR filed by Rocket Media, LLC, *Rocket Media* v. *Fullthrottle Technologies, LLC*, US Patent and Trademark Office, Patent Trial and Appeal Board, Nov. 12, 2024, 86 pages.
Patent Owner's Preliminary Response filed by Fullthrottle Technologies, LLC, *Rocket Media* v. *Fullthrottle Technologies, LLC*, US Patent and Trademark Office, Patent Trial and Appeal Board, Mar. 12, 2025, 44 Pages.
Patent Owner's Preliminary Response filed by Fullthrottle Technologies, LLC, *Rocket Media* v. *Fullthrottle Technologies, LLC*, US Patent and Trademark Office, Patent Trial and Appeal Board, Mar. 12, 2025, 45 pages.
Petition for IPR filed by Rocket Media, LLC, *Rocket Media* v. *Fullthrottle Technologies, LLC*, US Patent and Trademark Office, Patent Trial and Appeal Board, Nov. 12, 2024, 82 pages.

* cited by examiner

300

SCALABLE HOUSEHOLD TRANSACTION INGESTION SYSTEM AND METHOD

BACKGROUND

Various businesses market products using websites. Each product may have a dedicated webpage that is accessible from the business's website. Consumers access the specific webpages for more information regarding the specific products offered by the business entity. In an example, the business may be a car dealership (e.g., a car dealer). The car dealer may operate specific webpages for specific vehicles. Potential customers access the specific webpages for more information regarding the specific vehicles. The car dealer may be interested in understanding how many times a potential customer visits specific vehicle webpages via the dealer website. The car dealer may also be interested in learning more information about the potential customer.

Each purchase of a product may result in generation of transaction data. The generated transaction data may provide insight into a user, a household, a region, etc.

SUMMARY

Systems, methods, and apparatus are described herein for scalable household transaction ingestion. A method of scalable household transaction ingestion may include receiving first transaction data associated with a first transaction performed via a first browser session initialized by a first user via a first browser on a first user computing device. The first transaction data may include one or more of a time of the first transaction, first location data, a uniform resource locator (URL) associated with the first transaction, one or more items purchased, a payment method associated with the first transaction, or anonymous data associated with the first transaction. The anonymous data may include one or more of the time of the first transaction, a date of the first transaction, the URL associated with the first transaction, a referring URL, a browser type, a language, an internet protocol (IP) address, or the first location data. The method may include determining a first latitude coordinate and a first longitude coordinate of the first user computing device when the first transaction was performed. The first latitude coordinate and first longitude coordinate may be determined based on the anonymous data upon determining that the first user opted-out of location tracking. The first latitude coordinate and the first longitude coordinate may be determined based on geo-location data retrieved from the first user computing device upon determining that the first user opted-in to location tracking. The method may include determining a first address of a first household of the first user based on the first latitude coordinate and the first longitude coordinate using a map application programming interface (API). The method may include determining first resident density data for the first household at the determined first address based on the first transaction data. The method may include anonymizing the first resident density data to remove any personally identifiable information (PII). The method may include pre-processing the first transaction data and the first resident density data for analysis. The method may include determining whether resident density data for the first household is available.

The method may include receiving second transaction data associated with a second transaction performed via a second browser session initialized by a second user via a second browser on a second user computing device. The second transaction data may include one or more of a time of the second transaction, second location data, a second URL associated with the second transaction, one or more items purchased, a payment method associated with the second transaction, or anonymous data associated with the second transaction. The method may include determining a second latitude coordinate and a second longitude coordinate of the second user computing device when the second transaction was performed. The second latitude coordinate and second longitude coordinate may be determined based on the anonymous data upon determining that the second user opted-out of location tracking. The second latitude coordinate and the second longitude coordinate may be determined based on geo-location data retrieved from the second user computing device upon determining that the second user opted-in to location tracking. The method may include determining a second address of a second household of the second user based on the determined second latitude coordinate and the determined second longitude coordinate using the map API. The method may include determining second resident density data for the second household at the determined second address based on the second transaction data. The method may include pre-processing the second transaction data and the second resident density data for analysis.

The first residing density data and the second resident density data may be determined using parallel processing through horizontal warehouse scaling. The first resident density data may be determined using a first shard of a computing device and the second resident density data may be determined using a second shard of the computing device. The method may include attributing the first transaction data to the first household and the second transaction data to the second household using a multi-dwelling learning algorithm. The method may include updating the first resident density data upon determining that a second user in the first household performed a second transaction.

Another method of scalable household transaction ingestion may include receiving transaction data associated with a plurality of transactions performed by a plurality of users at a plurality of households. The transaction data may include one or more of respective times of the plurality of transactions, location data for each of the plurality of transactions, respective uniform resource locators (URLs) associated with the each of the plurality of transactions, the items purchased, respective payment methods associated with each of the plurality of transactions, or anonymous data associated with each of the plurality of transactions. The method may include determining an address for each of the households based on the transaction data using a map application programming interface (API). The method may include identifying users associated with each of the plurality of transactions. The method may include generating, using respective household shards for each of the households, resident density data for each of the households using the identified users and the transaction data. The method may include anonymizing the resident density data and the transaction data to remove any personally identifiable information (PII). The method may include pre-processing the anonymized transaction data and the anonymized resident density data for analysis.

DETAILED DESCRIPTION

Figure 1:
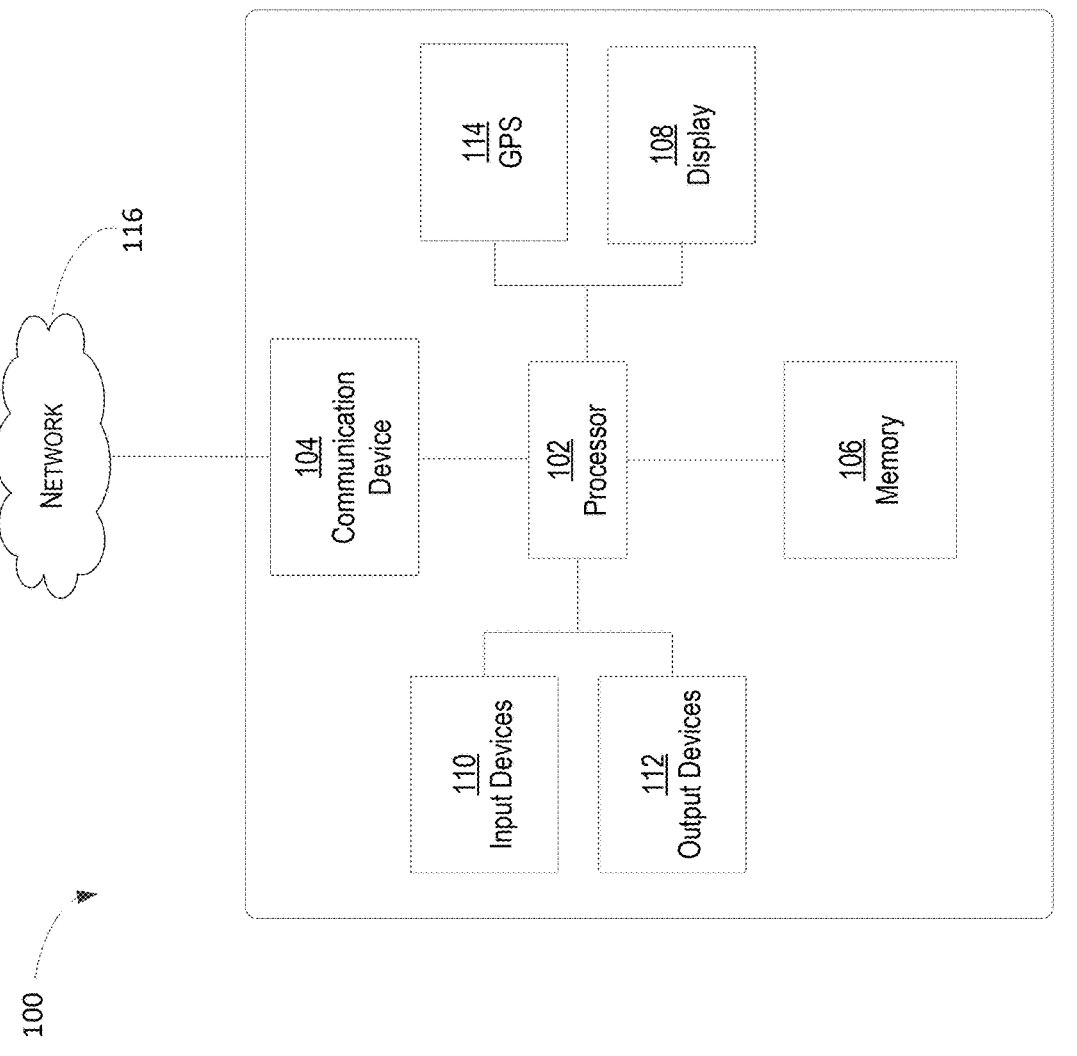
FIG. 1 illustrates a block diagram of an example computing device.

FIG. 1 illustrates a block diagram of an example computing device 100. The computing device 100 may include a personal computer, such as a laptop or desktop computer, a tablet device, a cellular phone or smartphone, a server, or another type of computing device. The computing device 100 may include a processor 102, a communication interface 104, a memory 106, a display 108, input devices 110, output devices 112, and/or a GPS circuit 114. The computing device 100 may include additional, different, or fewer components.

The processor 102 may include one or more general purpose processors, special purpose processors, conventional processors, digital signal processors (DSPs), microprocessors, integrated circuits, a programmable logic device (PLD), application specific integrated circuits (ASICs), or the like. The processor 102 may perform signal coding, data processing, image processing, power control, input/output processing, and/or any other functionality that enables the computing device 100 to perform as described herein.

The processor 102 may store information in and/or retrieve information from the memory 106. The memory 106 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory may be local memory or remote memory external to the computing device 100. The memory 106 may store instructions which are executable by the processor 102. Different information may be stored in different locations in the memory 106.

The memory 106 may comprise a computer-readable storage media or machine-readable storage media that stores computer-executable instructions for performing as described herein. The computer-executable instructions may comprise one or more portions of the procedures 300, 400, 500, 600, 800, 900, 1000, 1100, 1200, 1300, 1400, 1500, and/or 1600 for performing as described herein. The processor 102 may access the instructions from memory 106 for being executed to cause the processor 102 to operate as described herein, or to operate one or more devices as described herein.

The processor 102 that may communicate with other devices via the communication device 104. The communication device 104 may transmit and/or receive information over the network 116, which may include one or more other computing devices. The communication device 104 may perform wireless and/or wired communications. The communication device 104 may include a receiver, transmitter, transceiver, or other device capable of performing wireless communications via an antenna. The communication device 104 may be capable of communicating via one or more protocols, such as a cellular communication protocol, a Wi-Fi communication protocol, Bluetooth®, a near field communication (NFC) protocol, an internet protocol, another proprietary protocol, or any other radio frequency (RF) or communications protocol. The computing device 100 may include one or more communication devices 104.

The processor 102 may be in communication with a display 108 for providing information to a user. The information may be provided via a user interface on the display 108. The information may be provided as an image generated on the display 108. The display 108 and the processor 102 may be in two-way communication, as the display 108 may include a touch-screen device capable of receiving information from a user and providing such information to the processor 102.

The processor 102 may be in communication with a GPS circuit 114 for receiving geospatial information. The processor 102 may be capable of determining the GPS coordinates of the wireless communication device 100 based on the geospatial information received from the GPS circuit 114. The geospatial information may be communicated to one or more other communication devices to identify the location of the computing device 100.

The processor 102 may be in communication with input devices 110 and/or output devices 112. The input devices 110 may include a camera, a microphone, a keyboard or other buttons or keys, and/or other types of input devices for sending information to the processor 102. The display 108 may be a type of input device, as the display 108 may include touch-screen sensor capable of sending information to the processor 102. The output devices 112 may include speakers, indicator lights, or other output devices capable of receiving signals from the processor 102 and providing output from the computing device 100. The display 108 may be a type of output device, as the display 108 may provide images or other visual display of information received from the processor 102.

Figure 2:
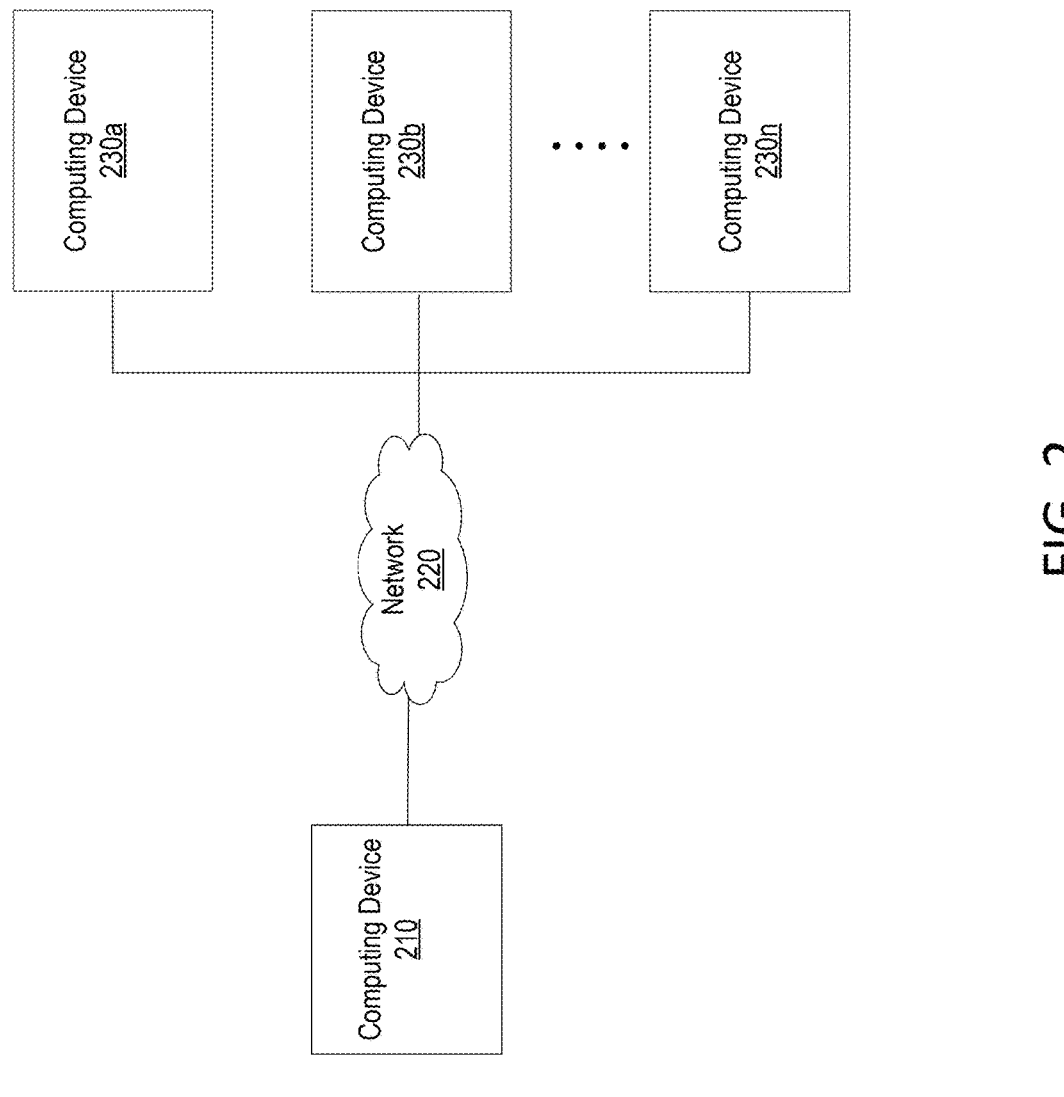
FIG. 2 illustrates a block diagram of an example computing network system.

FIG. 2 illustrates a block diagram of an example computing network system 200. The computing network system 200 may include one or more computing devices 230a-230n that may be capable of communicating digital messages with one another, either directly or via the network 220. The computing devices 230-230n may be user devices capable of logging into a session (e.g., a browsing session) of an interactive computing environment and providing real-time interactive data via the network 220. The network 220 may include a wired and/or wireless network. For example, the network 220 may include a Wi-Fi communication network, a Wi-MAX communication network, a cellular communication network (e.g., CDMA, HSPA+, LTE, etc.), and/or a television white space (TVWS) communication network. The network 220 may include one or more communication networks.

The one or more computing devices 230a-230n may be capable of communicating digital messages to and/or receiving digital messages from the computing device 210 via the network 220. The computing device 210 may be a server, such as a web server, for providing a user interface to the computing devices 230a-230n. The computing device 210 may be in communication with an application executing locally on the computing devices 230a-230n for providing a user interface at the computing devices. The display of information may be generated locally at the computing devices 230a-230n or at the computing device 210 and provided via an application (e.g., a web browser) at the computing devices 230a-230n.

One or more of the computing devices 230a-230n may be operated by an administrative user capable of configuring sessions of an interactive computing environment that may be stored at the computing device 210. The computing device operated by the administrative user may submit credentials to the computing device 210 to allow the session to be configured. The session may be accessed by the computing devices 230a-230n via the network 220.

Figure 3:
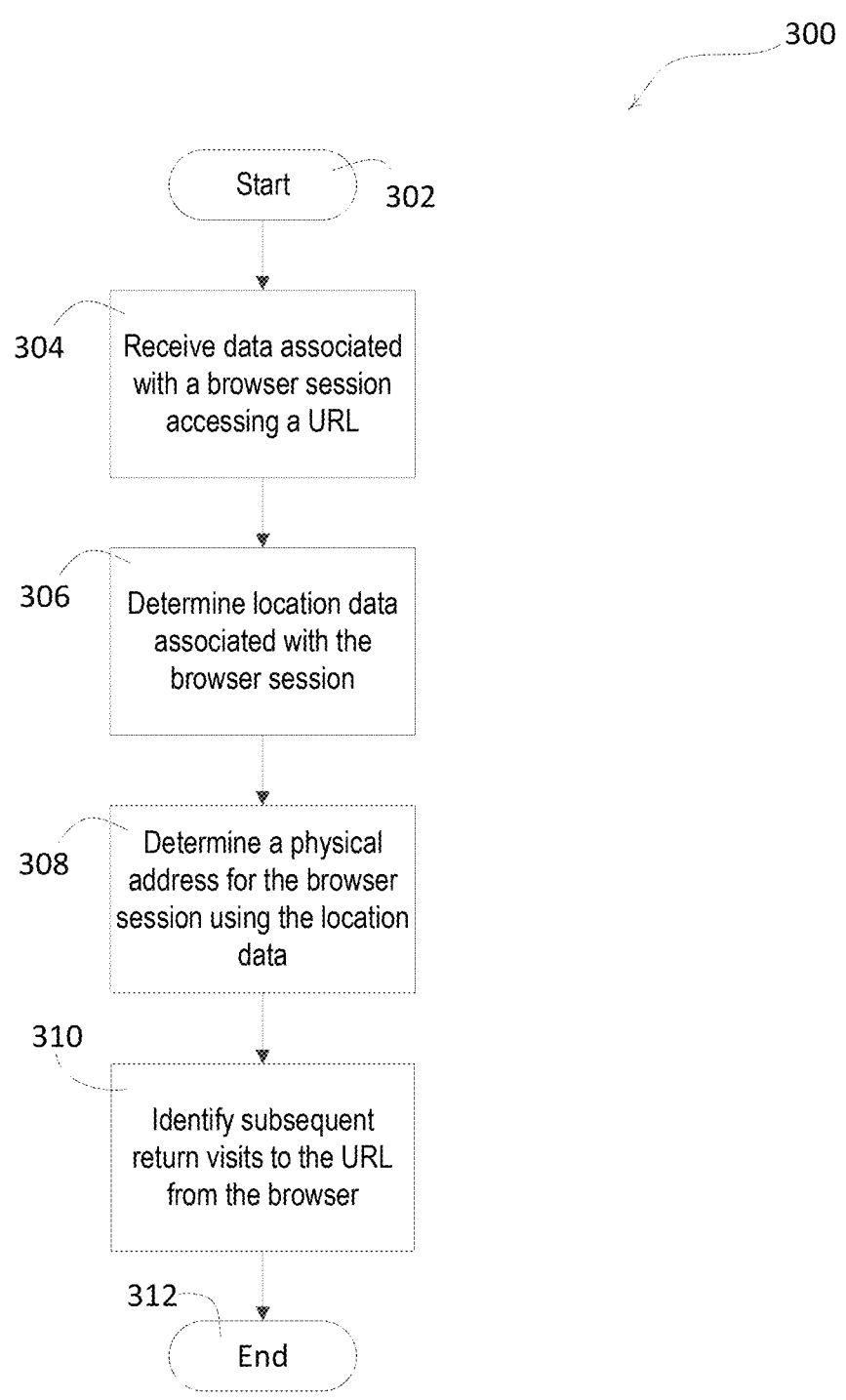
FIG. 3 is a flow diagram illustrating an example method that may be implemented to identify a physical address of a user based on anonymous data.

FIG. 3 is a flow diagram of an example method 300 that may be implemented by one or more computing devices (e.g., such as the computing devices 230a-230n shown in FIG. 2) to identify a physical address of a user based on anonymous data. The method 300, or portions thereof, may be performed to enable engagement with the user based on one or more return visits to a uniform resource locator (URL). Engagement with the user may include sending notification(s) to the user, determining one or more advertisements for the user, track service needs for a vehicle operated by the user or someone in the user's household, and/or the like. For example, the user may be an owner/operator of the vehicle. The notification(s) may include emails, text messages, mobile phone notifications, phone calls, advertisements, and/or the like. The method 300, or portions thereof, may be performed at a single computing device or may be distributed across multiple computing devices (e.g., multiple servers and/or a user device). The method 300, or portions thereof, may be performed to enable users, such as administrative users, to determine that the user has a specific interest in one or more products. The method 300, or portions thereof, may be performed to enable the administrative users to quantify the user's interest in the product(s). The method 300, or portions thereof, may be performed to enable adaptive generation of notifications to the user based on the specific interest in the product and/or the physical address associated with the user. The method 300 may comprise instructions that may be stored in memory as computer-readable or machine-readable storage media that may be executed by the one or more computing devices for executing the method 300. The method 300, or portions thereof, may reduce the amount of processing resources used by the computing device during a predetermined period (e.g., day). The method 300, or portions thereof, may improve the functionality of a computer network system (e.g., such as the computing network system 200 shown in FIG. 2) associated with engagement of the user. In addition, the method 300, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 300 may start, at 302, when a user computing device (e.g., such as computing device 210 shown in FIG. 2) accesses a URL. For example, a user may initialize a browser application on the user computing device and may navigate to a website (e.g., the URL) within the browser application using a browser session. The user may visit various URLs associated with a brand (e.g., manufacturer, company, etc.). Each of the URLs may correspond to a product sold by the brand.

As illustrated in FIG. 3, a computing device (e.g., such as computing device 230a, 230b, or 230n shown in FIG. 2) may receive, at 304, data from the browser session on the user computing device. The computing device may be associated with the URL. For example, the computing device may be a server that administers and/or manages a resource associated with the URL. The computing device may initialize a script (e.g., javascript, PHP, Python, Ruby, Groovy, Perl, and/or the like) when the data is received via the browser session. The computing device may retrieve the data using the script. The data may be associated with the user, the user computing device, and/or the browser application associated with the browser session. The data may be anonymous data (e.g., data that includes no personally identifiable information associated with the user). The anonymous data may include a time, a date, one or more website URLs, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 306, location data associated with the browser session. For example, the data received from the browser session may include the location data, as described herein. Additionally or alternatively, the computing device may determine the location data using a tracking cookie installed in the browser application on the user computing device. Using IP address and/or router location information may not provide accurate enough location data to identify a precise physical address for the user/user computing device. For example, an accuracy of approximately 70 meters could include a plurality of physical addresses within that radius. Using latitude and longitude location data of a mobile device may provide more accurate location data to enable identification of the precise physical address for the user/user computing device.

At 308, the computing device may determine a physical address (e.g., a postal address) for the browser session using the location data. The physical address may indicate a postal address at which the user accessed the URL in the browser session. For example, the computing device may generate, at 308, the physical address using a map API (e.g., such as Bing Maps API, Mapbox API, OpenStreetMap API, Leaflet API, OpenLayers API, Google Maps API, and/or another map API). For example, the computing device may translate, at 308, the received latitude and longitude coordinates into the physical address using the map API. The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The user may access the URL at multiple locations/addresses (e.g., home, work, store, restaurant, friend's home, etc.). The user computing device may identify which location/address is a primary address (e.g., home) and which location(s)/address(es) are secondary addresses, for example, based on the frequency of accessing the URL at each location/address. The user computing device may associate the secondary address(es) to the primary address.

The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

The computing device may generate a profile for the user, for example, based on the physical address and/or the other user information. The user profile may be used to track a plurality of factors associated with the user and the user's activity. For example, the user profile may track which URLs the user accesses, the frequency with which the user accesses the URL(s), demographics associated with the user, the address(es) associated with the user, the devices associated with the user etc. For example, the computing device may associate multiple unique identifiers having the same location data with the same user profile. The user profile may be used to generate a targeted marketing campaign.

At 310, the computing device may be configured to identify subsequent return visits to the URL (e.g., and related URLs) from the browser, the user computing device, and/or the physical address. For example, the computing device may store a unique ID in the browser application (e.g., using a cookie or using the local browser cache) to recognize that another browser session accessing the URL is from the user computing device at the same physical address. When another user computing device at the same physical address accesses the URL, the computing device may determine that that other user computing device is the same user and/or user household. The computing device may identify, at 310, that the user computing device is accessing the URL at a secondary address (e.g., associated with the user and/or user profile). The computing device may store a timestamp and the URL of each subsequent return visit from the browser, the user computing device, and/or the physical address. That is, the computing device may create a log of URLs accessed by a user profile associated with the browser, the user computing device, and/or the physical address. The log may track the timestamp and URL of each website accessed via the browser. The method 300 may end, at 312.

Figure 4:
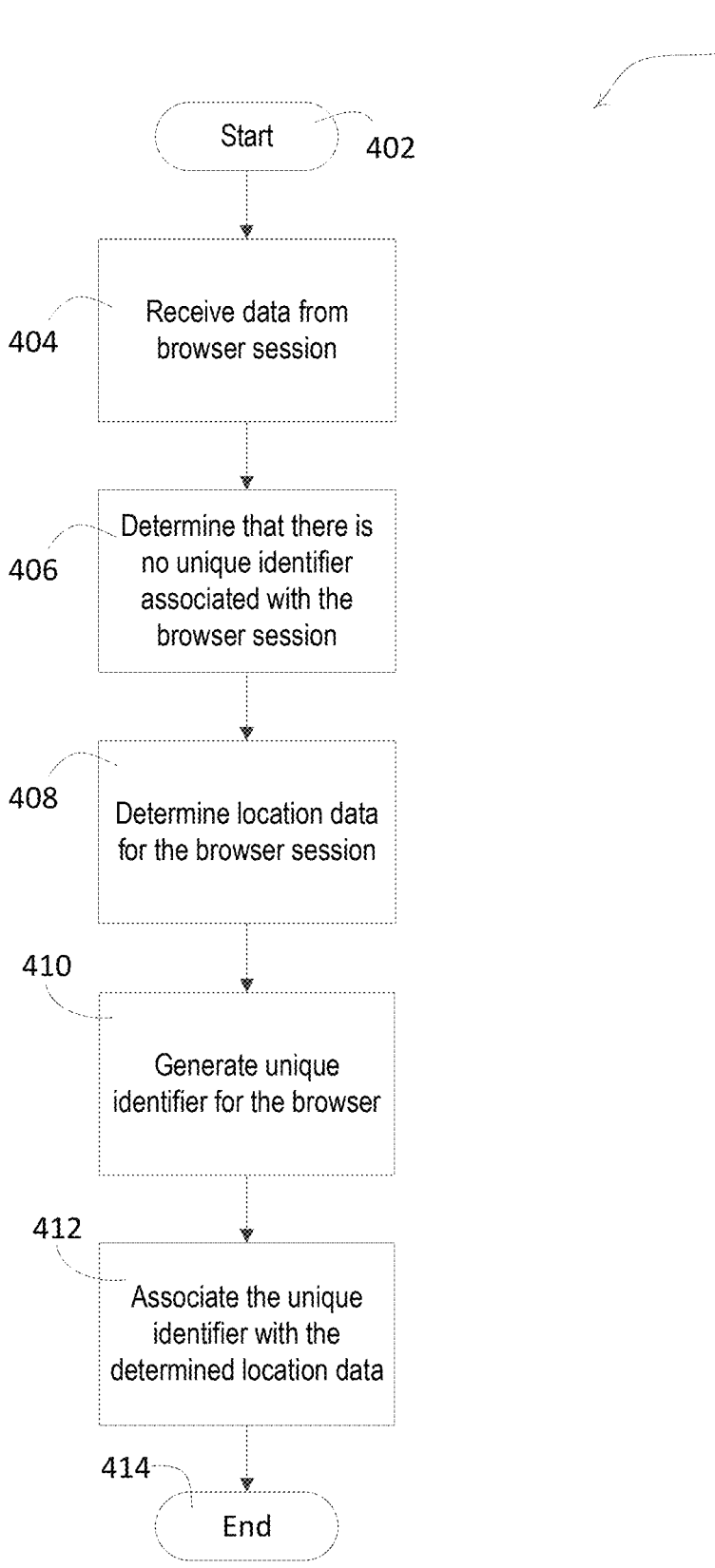
FIG. 4 is a flow diagram illustrating an example method for associating a unique identifier with location data from a browser session.

FIG. 4 is a flow diagram of an example method 400 that may be implemented by one or more computing devices (e.g., such as the computing devices 230a-230n shown in FIG. 2) to associate a unique identifier with location data from a browser session. The method 400, or portions thereof, may be performed to enable engagement with the user based on one or more visits to a URL. Engagement with the user may include sending notification(s) to the user, determining one or more advertisements for the user, track service needs for a vehicle owned and/or operated by the user or someone in the user's household, and/or the like. The notification(s) may include emails, text messages, mobile phone notifications, phone calls, advertisements, and/or the like. The method 400, or portions thereof, may be performed at a single computing device or may be distributed across multiple computing devices (e.g., multiple servers and/or a user device). The method 400, or portions thereof, may be performed to enable users, such as administrative users, to determine that the user has a specific interest in one or more products. The method 400, or portions thereof, may be performed to enable the administrative users to quantify the user's interest in the product(s). The method 400, or portions thereof, may be performed to enable adaptive generation of notifications to the user based on the specific interest in the product and/or the physical address associated with the user. The method 400 may comprise instructions that may be stored in memory as computer-readable or machine-readable storage media that may be executed by the one or more computing devices for executing the method 400. The method 400, or portions thereof, may reduce the amount of processing resources used by the computing device during a predetermined period (e.g., day). The method 400, or portions thereof, may improve the functionality of a computer network system (e.g., such as the computing network system 200 shown in FIG. 2) associated with engagement of the user. In addition, the method 400, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s).

The method 400 may start at 402, when a user computing device (e.g., such as computing device 210 shown in FIG. 2) accesses a URL. For example, a user may initialize a browser application on the user computing device and may navigate to the URL within the browser application using a browser session.

As illustrated in FIG. 4, a computing device (e.g., such as computing device 230a, 230b, or 230n shown in FIG. 2) may receive, at 404, data from the browser session on the user computing device. The computing device may be associated with the URL. For example, the computing device may be a server that administers and/or manages a resource associated with the URL. The computing device may initialize a script (e.g., javascript, PHP, Python, Ruby, Groovy, Perl, and/or the like) when the data is received via the browser session. The computing device may retrieve the data using the script. The data may be associated with the user, the user computing device, and/or the browser application associated with the browser session. The data may be anonymous data (e.g., data that includes no personally identifiable information associated with the user). The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 406, whether there is a unique identifier that is associated with the user (e.g., the user computing device, the browser, and/or the browser session) stored on the computing device. For example, the script may inform the computing device that there is no unique identifier for the user computing device. The computing device may determine that there is no unique identifier associated with the user computing device when there is no location data stored for the user computing device. For example, the computing device may access a database or other storage location that maintains a mapping of unique identifier to a browser session, a user computing device, and/or location data. Additionally or alternatively, the computing device may determine whether there is a unique identifier for associated with the user based on presence of a location tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein.

At 408, the computing device may determine location data associated with the browser session. For example, the data received from the browser session may include the location data, as described herein. Additionally or alternatively, the computing device may determine the location data using the tracker installed in the browser application on the user computing device. The computing device may determine a physical address (e.g., a postal address) for the browser session using the location data. The physical address may indicate a postal address at which the user accessed the URL in the browser session. For example, the computing device may generate, at 408, the physical address using a map API (e.g., such as Bing Maps API, Mapbox API, OpenStreetMap API, Leaflet API, OpenLayers API, Google Maps API, and/or another map API). For example, the computing device may translate, at 408, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 410, the computing device may be configured to generate a unique identifier for the browser. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the browser based on the data received, at 404, via the browser session. The computing device may send the unique identifier to the user computing device (e.g., for storage in local browser cache or a cookie).

At 412, the computing device may associate the generated unique identifier with the determined location data. For example, the computing device may map, at 412, the unique identifier to the location data (e.g., physical address). The mapping between the unique identifier and the location data may enable identification of future visits to the URL by the user. The method 400 may end, at 414.

Figure 5:
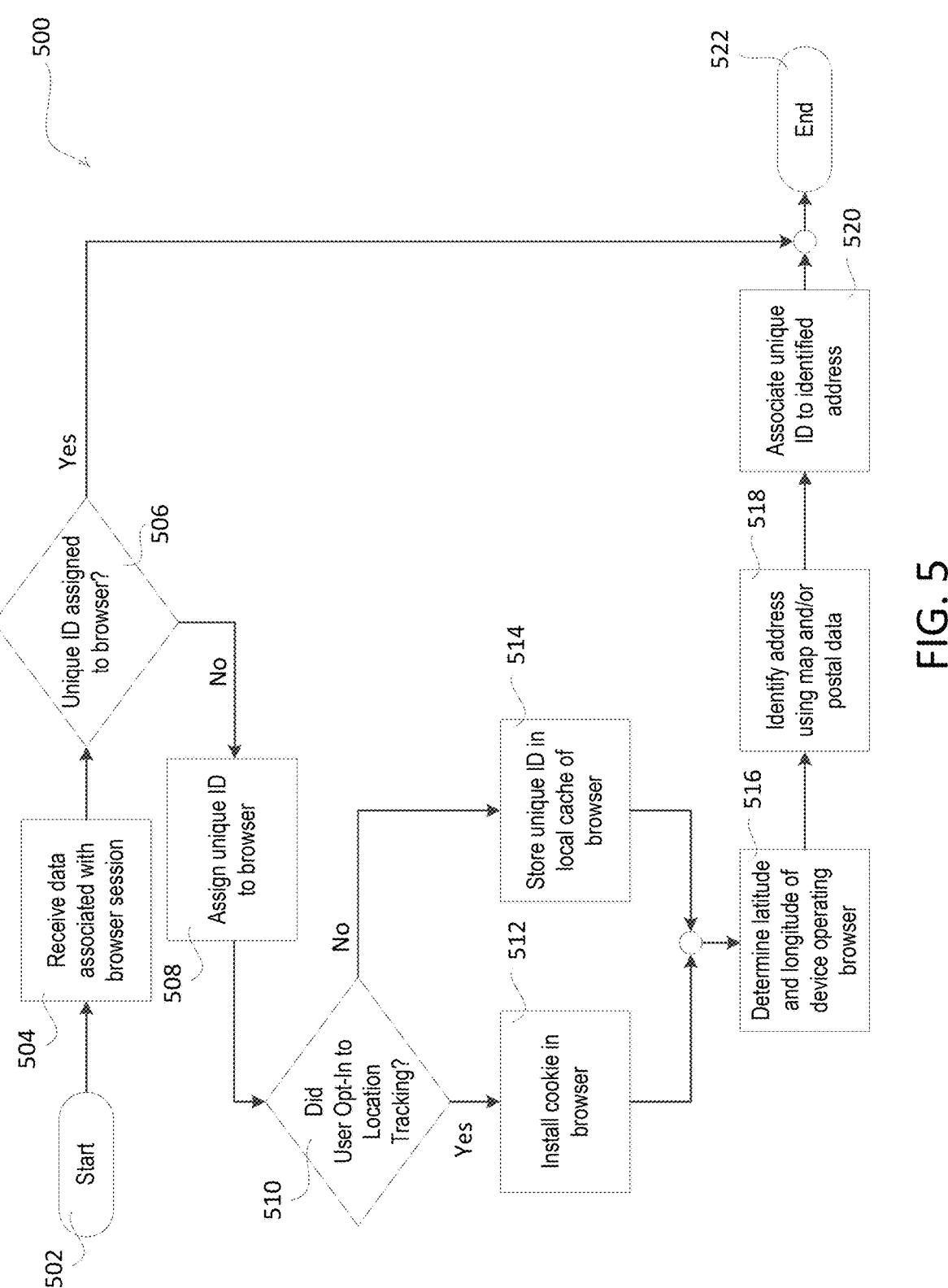
FIG. 5 is a flow diagram illustrating an example method for associating a unique identifier with a physical address of a user.

FIG. 5 is a flow diagram of an example method 500 that may be implemented by one or more computing devices (e.g., such as the computing devices 230a-230n shown in FIG. 2) to associate a unique identifier with a physical address associated with a user. The method 500, or portions thereof, may be performed to enable engagement with the user based on one or more visits to a URL. Engagement with the user may include sending notification(s) to the user, determining one or more advertisements for the user, track service needs for a vehicle operated by the user or someone in the user's household, and/or the like. The notification(s) may include emails, text messages, mobile phone notifications, phone calls, advertisements, and/or the like. The method 500, or portions thereof, may be performed at a single computing device or may be distributed across multiple computing devices (e.g., multiple servers and/or a user device). The method 500, or portions thereof, may be performed to enable users, such as administrative users, to determine that the user has a specific interest in one or more products. The method 500, or portions thereof, may be performed to enable the administrative users to quantify the user's interest in the product(s). The method 500, or portions thereof, may be performed to enable adaptive generation of notifications to the user based on the specific interest in the product(s) and/or the physical address associated with the user. The method 500, or portions thereof, may reduce the amount of processing resources used by the computing device during a predetermined period (e.g., day). The method 500 may comprise instructions that may be stored in memory as computer-readable or machine-readable storage media that may be executed by the one or more computing devices for executing the method 500. The method 500, or portions thereof, may improve the functionality of a computer network system (e.g., such as the computing network system 200 shown in FIG. 2) associated with engagement of the user. In addition, the method 500, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 500, or portions thereof, may enable tracking of a user without the use of tracking cookies. The method 500, or portions thereof, may be combined with the method 300 and/or the method 400.

The method 500 may start, at 502, when a user computing device (e.g., such as computing device 210 shown in FIG. 2) accesses a URL. For example, a user may initialize a browser application on the user computing device and may navigate to the URL within the browser application using a browser session.

As illustrated in FIG. 5, a computing device (e.g., such as computing device 230a, 230b, or 230n shown in FIG. 2) may receive, at 504, data from the browser session on the user computing device. The computing device may be associated with the URL. For example, the computing device may be a server that administers and/or manages a resource associated with the URL. The data may be associated with the user, the user computing device, and/or the browser application associated with the browser session. The data may be anonymous data (e.g., data that includes no personally identifiable information associated with the user). The anonymous data may include a time, a date, a webpage URL, a referring URL, a browser type, a language, an IP address, and/or location data. The computing device may determine a device type based on the browser type. For example, the computing device may determine whether the user computing device is a mobile device based on the browser type. The location data may include a latitude coordinate, a longitude coordinate, and/or a device accuracy indication. The device accuracy indication may indicate the accuracy associated with the user computing device's measurements of the latitude coordinate and the longitude coordinate. For example, the device accuracy indication may indicate the accuracy of the user computing device's GPS (e.g., such as the GPS 114 shown in FIG. 1). The device accuracy may depend on the device type. For example, a mobile device may indicate a device accuracy of approximately 2 meters or less and a computer that accesses the URL via a router may indicate a device accuracy of approximately 70 meters. The anonymous data may be included in a header (e.g., a HTTP request header) received from the user computing device, included in the IP address of the user computing device, included in scripts at the application-level, etc.

The computing device may determine, at 506, whether there is a unique identifier that is associated with the user (e.g., the user computing device, the browser, and/or the browser session) stored on the computing device. The computing device may determine that there is no unique identifier associated with the user computing device when there is no location data stored for the user computing device. For example, the computing device may access a database or other storage location that maintains a mapping of unique identifier to a browser session, a user computing device, and/or location data. Additionally or alternatively, the computing device may determine whether there is a unique identifier for associated with the user based on presence of a tracker (e.g., cookie) installed in the browser application on the user computing device. The tracker may include the unique identifier associated with the user. The tracker may have been installed in the user's browser application (e.g., by the computing device) during a previous visit to the URL via the user's browser application, for example, if the user opted-in to location tracking, as described herein.

When the computing device determines that there is no unique identifier assigned to the user, the computing device may be configured to generate, at 508, a unique identifier for the user. The unique identifier may be generated randomly. The unique identifier may be universally unique. That is, the unique identifier may be unique for all browsers, all device types, all locations, etc. Alternatively, the unique identifier may be parsed from the data received in the browser session. Stated differently, the computing device may determine the unique identifier for the user based on the data received, at 504, via the browser session.

The computing device may determine, at 510, whether the user opted-in to location tracking. For example, the user may be asked to opt-in to location tracking when accessing the URL. The user may respond to a prompt by opting in or opting out to location tracking.

When the user opts-in to location tracking, the computing device may install, at 510 a tracker (e.g., a cookie) in the browser application on the user computing device. The cookie may be configured to enable the computing device to retrieve geo-location data from the user computing device. The cookie may enable the computing device to recognize return visits by the user computing device. The cookie (e.g., a tracking cookie, browser cookie, HTTP cookie, etc.) may include a small string or segment of text that may be transmitted to the user computing device and stored at the user computing device by a browser application. For example, the cookie may include one or more name-value pairs containing bits of information such as, user preferences, an identifier (e.g., the unique ID assigned at 508) for a server-based user session, and/or other data used by the computing device (e.g., a server and/or website). The cookie may be used for authenticating, session tracking (e.g., state maintenance), and/or for tracking specific information about a user, such as site preferences, and/or to maintain data related to the user and/or user computing device during navigation. The cookie may be sent in an HTTP header by the computing device to the browser application at the user computing device. The cookie may be sent back to the computing unchanged by the browser application, for example, each time the browser application accesses the URL, introducing state into what may be otherwise stateless HTTP transactions. The computing device may set the cookie at the user computing device in response to a request for a target website (e.g., the URL), the computing device may generate and transmit an HTTP response that includes an HTTP header that includes the parameters for the cookie (e.g., in the form of text) and/or code (e.g., Set-Cookie) requesting the browser application to set the cookie based on the parameters in the HTTP header.

When the user opts-out to location tracking, the computing device may store, at 514, a unique ID (e.g., the unique ID assigned at 508) in a local cache of the user computing device (e.g., of the browser). The unique ID may be stored in the local browser cache, for example, even if the user computing device does not allow cookies (e.g., full cookies). Storing the unique ID in the local browser cache may enable the computing device to recognize return visits by the user computing device via the browser application. The unique ID may be used for authenticating, session tracking (e.g., state maintenance), and/or for tracking specific information about a user, such as site preferences, and/or to maintain data related to the user and/or user computing device during navigation. The unique ID may be sent in an HTTP header by the computing device to the browser application at the user computing device. The computing device may store the unique ID in the local browse cache at the user computing device in response to a request for a target website (e.g., the URL). The user computing device may store the unique ID as key/value (e.g., string to string) in the local browser cache. The unique ID may enable persistence across browser sessions. For example, the unique ID may be recognizable in subsequent browser sessions. The unique ID may remain in the local browser cache, for example, until the local browser cache is explicitly cleared. Storing the unique ID in the local browser cache may not be persistent across browser applications. For example, the unique ID stored in the local browser cache of a one browser application may not be accessible from another browser application.

The computing device may determine, at 516, a latitude coordinate and a longitude coordinate of the user computing device. For example, the data received from the browser session may include the latitude and longitude coordinates of the user computing device, as described herein. The computing device may use the latitude and longitude coordinates to track a user. Use of the latitude and longitude coordinates for tracking may improve device and/or network security, for example, by eliminating the need for cookies to track the user.

The computing device may determine, at 518, a physical address (e.g., a postal address) for the browser session using the location data. The physical address may indicate a postal address at which the user accessed the URL in the browser session. For example, the computing device may generate, at 518, the physical address using a map API (e.g., such as Bing Maps API, Mapbox API, OpenStreetMap API, Leaflet API, OpenLayers API, Google Maps API, and/or another map API). For example, the computing device may translate, at 514, the received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, and/or living status. The psychographics associated with the user may include personality traits, lifestyles, interests, opinions, beliefs, values, etc. The computing device may determine the type and/or the frequency of notifications sent to the user based on the other information. The computing device may determine the content of the notifications based on the other information.

At 520, the computing device may associate the generated unique identifier with the determined location data. For example, the computing device may map, at 520, the unique identifier to the location data (e.g., physical address). The mapping between the unique identifier and the location data may enable identification of future visits to the URL by the user. The mapping between the unique identifier and the location data may enable an administrative user to identify who is accessing specific URLs, for example, with or without the use of cookies. For example, the unique identifier and location data may enable convergence of an online and offline footprint for a user.

The computing device may generate a profile for the user, for example, based on the association between the unique identifier and the location data. The user profile may be used to track a plurality of factors associated with the user and the user's activity. For example, the user profile may track which URLs the user accesses, the frequency with which the user accesses the URL(s), demographics associated with the user, the address(es) associated with the user, etc. For example, the computing device may associate multiple unique identifiers having the same location data with the same user profile. The user profile may be used to generate a targeted marketing campaign. The method 500 may end, at 522.

Figure 6:
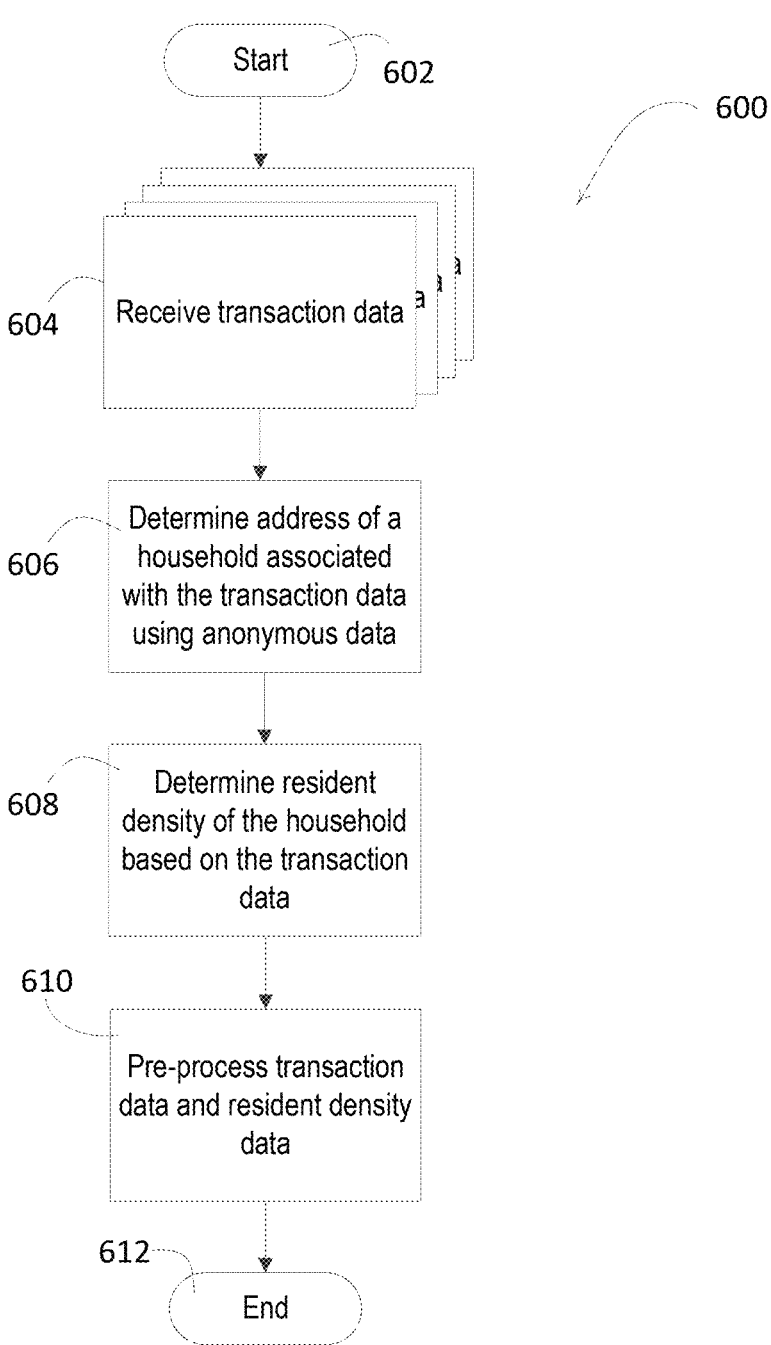
FIG. 6 is a flow diagram illustrating an example method for pre-processing transaction data and resident density data.

FIG. 6 is a flow diagram of an example method 600 that may be implemented by one or more computing devices (e.g., such as the computing device 210 and/or the computing devices 230a-230n shown in FIG. 2) to process transaction data to determine resident density data. The transaction data may be associated with a transaction of a product. For example, the transaction may include purchasing, leasing, or renting the product. The product may be a vehicle. The method 600, or portions thereof, may be performed to enable determination of household data associated with the transaction data. For example, household data may be determined for one or more households based on transaction data associated with a plurality of transactions. The method 600, or portions thereof, may be performed at a single computing device or may be distributed across multiple computing devices (e.g., multiple servers and/or a user device). The method 600, or portions thereof, may be performed to enable users, such as administrative users, to determine that the user has a specific interest in one or more products. The method 600, or portions thereof, may be performed to enable the administrative users to pre-process transaction data and resident density data. The method 600 may comprise instructions that may be stored in memory as computer-readable or machine-readable storage media that may be executed by the one or more computing devices for executing the method 600. The method 600, or portions thereof, may reduce the amount of processing resources used by the computing device during a predetermined period (e.g., day). The method 600, or portions thereof, may improve the functionality of a computer network system (e.g., such as the computing network system 200 shown in FIG. 2) associated with engagement of the user. In addition, the method 600, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 600, or portions thereof, may be combined with the method 300, the method 400, and/or the method 500.

The method 600 may start, at 602, when a user performs a transaction. For example, a user may initialize a browser application on the user computing device and may navigate to a URL within the browser application using a browser session. The user may then perform a transaction that is associated with the URL visited during the browser session.

As illustrated in FIG. 6, a computing device (e.g., such as computing device 210, computing device 230a, 230b, or 230n shown in FIG. 2) may receive, at 604, transaction data associated with one or more transactions. Each of the transactions may be associated with the same household or may be associated with different households. The transaction data may include information that is gathered from the one or more transactions, such as sales, purchases, or other events that involve the exchange or modification of data. The transaction data may include a time of the transaction, location data (e.g., a place associated with the transaction), the item(s) purchased, the payment method, discounts, and/ or anonymous data (e.g., data that includes no personally identifiable information associated with the user). The anonymous data may include a time, a date, one or more website URLs, a referring URL, a browser type, a language, an IP address, and/or location data.

At 606, the computing device may determine location data associated with each of the one or more transactions. For example, the computing device may determine, at 606, an address of a household associated with each of the one or more transactions. The computing device may determine the address of the household using anonymous data received in the transaction data. The address of the household may be a physical address that indicates a postal address at which the user performed the respective transaction. For example, the computing device may generate the physical address using a map API (e.g., such as Bing Maps API, Mapbox API, OpenStreetMap API, Leaflet API, OpenLayers API, Google Maps API, and/or another map API). For example, the computing device may translate received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user, an age of the user, a gender of the user, demographics associated with the user, and/or psychographics associated with the user. The demographics associated with the user may include race, marital status, household size, occupation, income, education, living status, and/or housing value. The psychographics associated with the user may include personality traits, lifestyles, interests, opinions, beliefs, values, etc.

The computing device may generate a profile for the user, for example, using the transaction data, a unique identifier, location data (e.g., one or more addresses), and/or other information. The user profile may be used to track a plurality of factors associated with the user and the user's activity. For example, the user profile may track the transactions the user performs, the items the user purchases, URLs the user accesses, the frequency with which the user accesses the URL(s), demographics associated with the user, the address(es) associated with the user, etc. For example, the computing device may associate multiple transactions having the same location data with the same user profile. The user profile may enable generation of a targeted marketing campaign, quantification of a user's interest in one or more products/brands, identify similar products that the user may be interested in, and/or tracking health of one or more vehicles owned/operated by the user.

At 608, the computing device may determine resident density data associated with the household. The resident density data may represent a resident density of the household. The resident density data may be a measure of the number of shoppers in the household. For example, the resident density data may be determined as a ratio of shoppers to bedrooms in the household. The computing device may use the resident density data to perform a density analysis. The density analysis may be associated with an area, for example, such as a zip code, a neighborhood, a street, and/or a building. The density analysis may determine how many shoppers (e.g., active shoppers) are within the area. The density analysis may be performed and/or updated after each transaction, for example, to identify resident density trends. The density analysis may be used in user behavior assessment, advertisement performance, campaign performance, probability analyses, attribution of advertisement, conversion rates, return on investment (e.g., return on advertisement spend), campaign optimization, audience segmentation, cost per acquisition, and/or the like.

At 610, the computing device may pre-process the received transaction data and/or the resident density data. The received transaction data and/or the resident density data may be pre-processed for further analysis. The computing device may make the transaction data and/or the resident density data readily available, for example, in a supervised pre-flight staging area. The computing device may store the transaction data and/or resident density data for each household in separate tables (e.g., such as household specific tables). For example, the computing device may pre-aggregate the transaction data and/or resident density data to reduce the amount of data stored and enable more efficient data retrieval. The computing device may prep the transaction data and/or resident density data for various specialized post-processing data analytics and data science. For example, the computing device may prep the transaction data and/or the resident density data for user behavior assessment, advertisement performance, campaign performance, probability analyses, attribution of advertisement, conversion rates, return on investment (e.g., return on advertisement spend), campaign optimization, audience segmentation, cost per acquisition, and/or the like. The method 600 may end, at 612.

The computing device may be configured to send one or more notifications to the user based on the received transaction data and/or the resident density data. The one or more notifications may include advertisements associated with products the user(s) may be interested in, coupons for product(s), queries for questions about products, and/or the like. The computing device may determine the type and/or the frequency of notifications sent to the user based on the other information (e.g., a name associated with the user, an age of the user, a gender of the user, demographics associated with the user, and/or psychographics associated with the user). The computing device may determine the content of the notifications based on the other information. For example, the computing device may use the received transaction data, the resident density data, and/or other information associated with a plurality of users as filtering criteria for a targeted marketing campaign. The filtering criteria may be overlaid on top of the received transaction data, for example, to identify which users to target in the marketing campaign.

The computing device may update the resident density data upon receipt of subsequent transaction data. The computing device may be configured to identify subsequent transactions by users associated with the physical address. For example, the computing device may recognize that another user has performed a transaction at the same physical address as another user. The computing device may store a timestamp of each subsequent transaction from the physical address. For example, the computing device may create a log of transactions performed by user computing devices associated with a household. The log of transactions may be used by the computing device to develop a household profile. When a frequency of transactions by the user or the household increase over a predetermined period, the computing device may determine that the household is purchasing items and may determine to send coupons and/or advertisements to user computing devices associated with the household.

Figure 7:
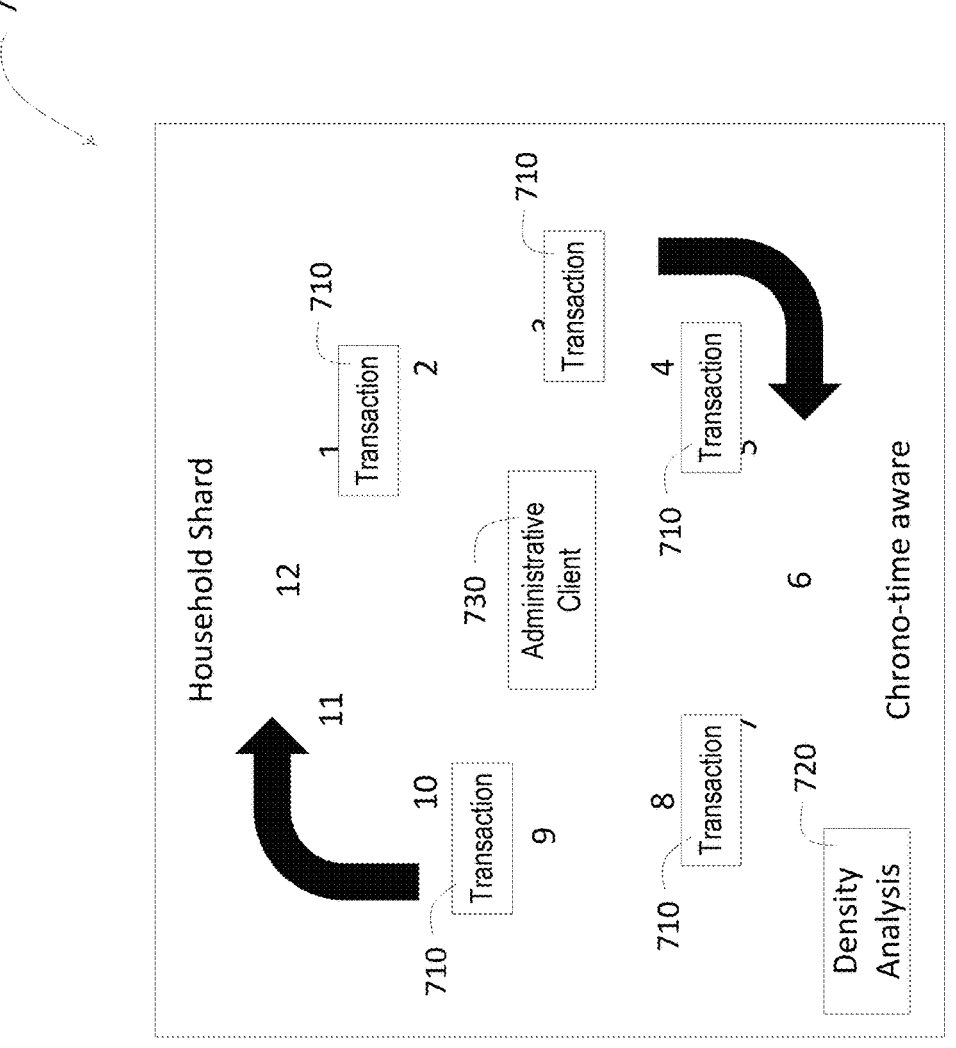
FIG. 7 is a block diagram depicting an example household shard.

FIG. 7 is a block diagram depicting a household shard 700 within a computing device (e.g., such as the computing device 210 and/or the computing devices 230a-230n shown in FIG. 2). The household shard 700 may represent a partition of data on the computing device that is associated with a specific household. For example, the household shard 700 may represent a process performed on the partition of data associated with the specific household. The household shard 700 may be a scalable household transaction ingestion system that enables multi-dimensional outcome matching across multiple administrative clients and/or users with a household focus.

The household shard 700 may track a plurality of transactions 710 performed by users within the household. The household shard 700 may receive transaction data associated with each of the plurality of transactions 710. The household shard 700 may be chrono-time aware. For example, the household shard 700 may identify a time associated with each of the plurality of transactions 710. The household shard 700 may store the time of each transaction as a code interval between transactions. The transaction data may include information that is gathered from the one or more transactions, such as sales, purchases, or other events that involve the exchange or modification of data. The transaction data may include a time of the transaction, a place of the transaction, the item(s) purchased, the payment method, and/or discounts. Additionally or alternatively, the transaction data may include anonymous data (e.g., data that includes no personally identifiable information associated with the user). The anonymous data may include a time, a date, one or more website URLs, a referring URL, a browser type, a language, an IP address, and/or location data. The household shard 700 may store the transaction data associated with each of the transactions. The household shard 700 may update based on receipt of additional transactions performed by users within the household.

The household shard 700 may include a density analysis client 720. The density analysis client 720 may determine (e.g., calculate) resident density data associated with the household. For example, the density analysis client 720 may determine the resident density data based on the transactions 700 (e.g., the transaction data associated with the transactions 700). For example, the density analysis client 720 may attribute specific transactions to specific users. The density analysis client 720 may attribute the transactions 700 to specific households (e.g., first transaction data to a first household and second transaction data to a second household) using a multi-dwelling learning algorithm. For example, the multi-dwelling learning algorithm may be configured to attribute and/or identify density related to clustered residents and/or customers. The multi-dwelling learning algorithm may be a machine learning model that is trained using the transaction data associated with the transactions 700 and/or the resident density data. The multi-dwelling learning algorithm may enable time-sensitive household activity recognition, for example, to understand and interpret household activity over time related to the transactions 700.

The multi-dwelling learning algorithm may include a linear regression model, a random forest model, or a neural network. The multi-dwelling learning algorithm may receive as input the transaction data and/or location data. The neural network may be a hybrid neural network comprising a convolutional portion and a fully-connected feed forward portion. After being trained, the multi-dwelling learning algorithm may receive as input the transaction data and/or location data. The multi-dwelling learning algorithm may be used to attribute and/or identify resident density data associated with one or more households.

The resident density data may represent a resident density of the household. The resident density data may be a measure of the number of shoppers in the household. For example, the resident density data may be determined as a ratio of shoppers to bedrooms in the household. The computing device may use the resident density data to perform a density analysis. The density analysis may be associated with an area, for example, such as a zip code, a neighborhood, a street, and/or a building. The density analysis may determine how many shoppers (e.g., active shoppers) are within the area. The density analysis may be performed and/or updated after each transaction, for example, to identify resident density trends. The density analysis may be used in probability analyses, for example, as described herein.

The household shard 700 may include an administrative client 730. The administrative client 730 may enable access to the transaction data and/or resident density data associated with the household. For example, the administrative client 730 may be used by one or more administrative users to access the household shard 700. The administrative user(s) may determine whether to send one or more notifications to the household (e.g., one or more users within the household) based on accessing the household shard 700 via the administrative client 730. For example, the administrative user(s) may process the transaction data and/or the resident density data from the household shard 700 to determine whether to send one or more notifications to the household. The administrative client 730 may leverage time-aware technology and learning algorithms to provide insight into household activities (e.g., household transactions) and resident density data.

Figure 8:
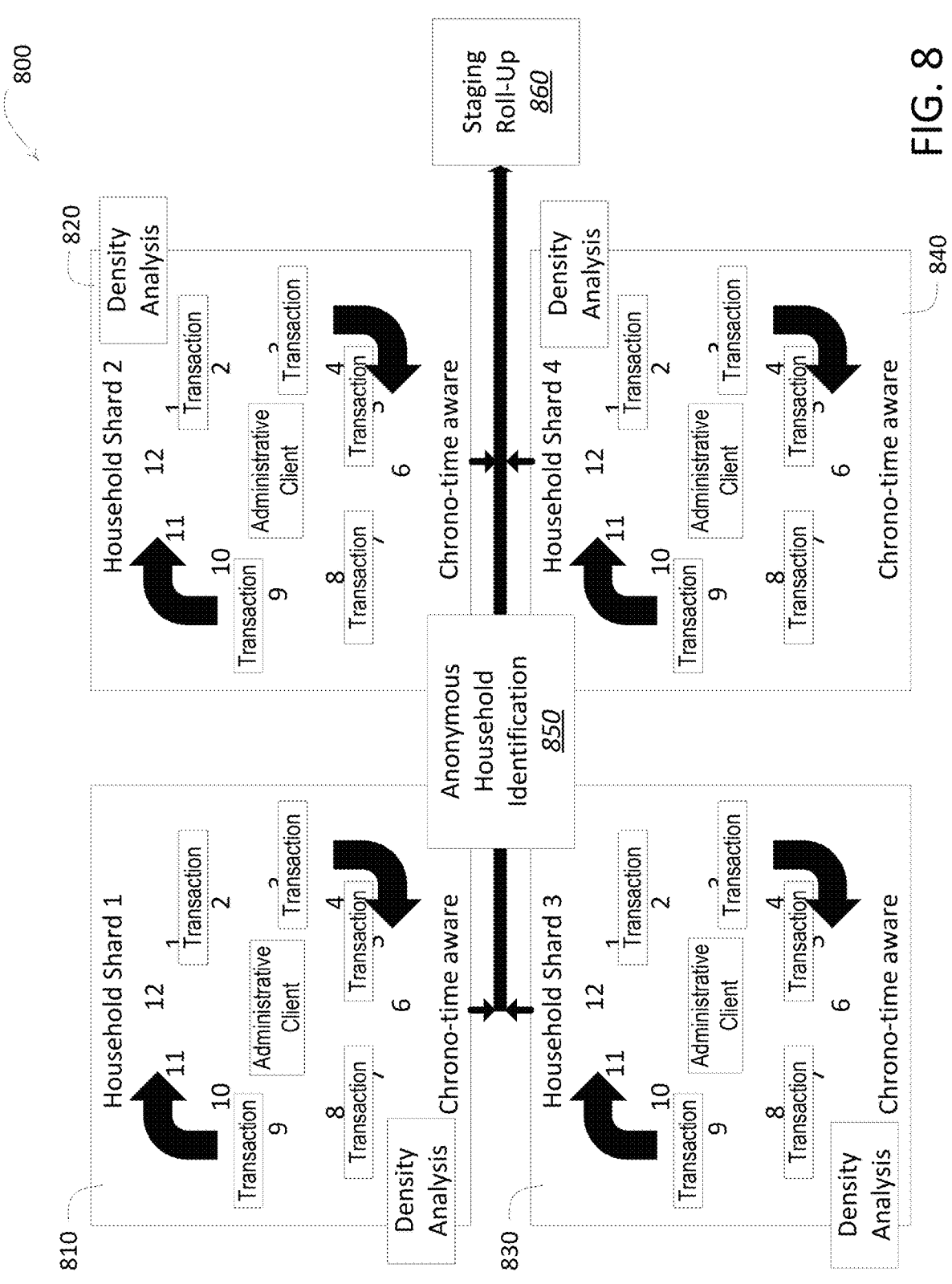
FIG. 8 is a block diagram depicting an example transaction ingestion system.

FIG. 8 is a block diagram depicting a transaction ingestion system 800. The transaction ingestion system 800 may be executed within a computing device (e.g., such as the computing device 210 and/or the computing devices 230a-230n shown in FIG. 2). The transaction ingestion system 800 may include a plurality of household shards 810, 820, 830, 840 that each represent a partition of data associated with a specific household. Each of the household shards 810, 820, 830, 840 may be similar to the household shard 700 shown in FIG. 7. The transaction ingestion system 800 may be a scalable household transaction ingestion system that enables multi-dimensional outcome matching across multiple administrative clients and/or users with a household focus. The transaction ingestion system 800 may integrate advanced software with database hardware and may feature distributed tables, schemas, and a potent query engine. The distributed tables, schemas, and/or potent query engine may enable efficient and rapid analyses on the data stored. The transaction ingestion system 800 may utilize parallel processing, for example, through horizontal warehouse scaling. For example, the transaction ingestion system 800 may be configured to initialize additional household shards to increase data processing and/or storage capacity. For example, the transaction ingestion system 800 may initialize a household shard when transaction data is received for a household that has not been identified by previously received transaction data. The transaction ingestion system 800 may include parallel indexing, constraint checking, and/or disk writing capabilities. The transaction ingestion system 800 may include time-aware technology to understand and interpret household activity over time relative to transactions. For example, the transaction ingestion system 800 may be used to identify household activities and/or habits for further analysis.

The household shard 810 may be associated with a first household and may store transaction data and resident density data associated with the first household. The household shard 820 may be associated with a second household and may store transaction data and resident density data associated with the second household. The household shard 830 may be associated with a third household and may store transaction data and resident density data associated with the third household. The household shard 840 may be associated with a fourth household and may store transaction data and resident density data associated with the fourth household.

The transaction ingestion system 800 may include an anonymous household identification module 850. The anonymous household identification module 850 may anonymize the transaction data and/or resident density data for each of the household shards 810, 820, 830, 840. For example, the anonymous household identification module 850 may remove, suppress, and/or modify personally identifiable information (PII) from the transaction data and/or resident density data to prevent individuals and/or specific households from being identified. The anonymous household identification module 850 may be configured to protect data privacy while preserving statistical accuracy and data integrity.

The transaction ingestion system 800 may include a staging roll-up module 860. The staging roll-up module 860 may represent a pre-flight staging zone. The staging roll-up module 860 may make outputs of the household shards 810, 820, 830, 840 and/or the anonymous household identification module 850 readily available, for example, in a supervised pre-flight staging area. The staging roll-up module 860 may store the outputs in separate tables. For example, the staging roll-up module 860 may pre-aggregate the outputs to reduce the amount of data stored and enable more efficient data retrieval. The staging roll-up module 860 may prep the outputs of the household shards 810, 820, 830, 840, and/or the anonymous household identification module 850 for various specialized post-processing data analytics and data science. For example, the staging roll-up module may prep the outputs for user behavior assessment, advertisement performance, campaign performance, probability analyses, attribution of advertisement, conversion rates, return on investment (e.g., return on advertisement spend), campaign optimization, audience segmentation, cost per acquisition, and/or the like.

Figure 9:
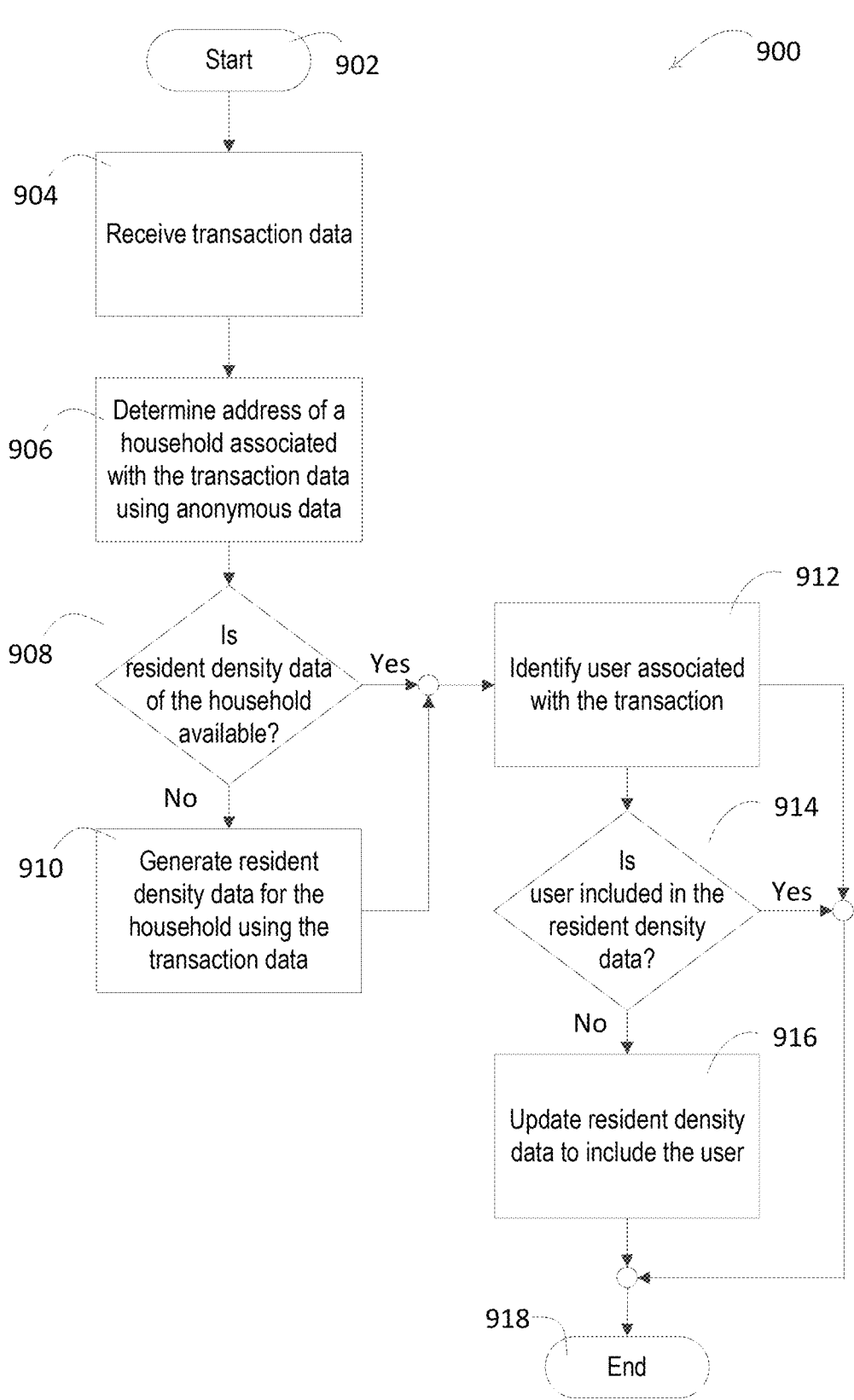
FIG. 9 is a flow diagram illustrating an example method for determining resident density data.

FIG. 9 is a flow diagram of an example method 900 that may be implemented by one or more computing devices (e.g., such as the computing device 210 and/or the computing devices 230a-230n shown in FIG. 2) to determine resident density data. The resident density data may represent a resident density of the household. The resident density data may be a measure of the number of shoppers in the household. For example, the resident density data may be determined as a ratio of shoppers to bedrooms in the household. The method 900, or portions thereof, may be performed at a single computing device or may be distributed across multiple computing devices (e.g., multiple servers and/or a user device). The method 900, or portions thereof, may be performed to enable the administrative users to pre-process 900 resident density data. The method 900 may comprise instructions that may be stored in memory as computer-readable or machine-readable storage media that may be executed by the one or more computing devices for executing the method 900. The method 900, or portions thereof, may reduce the amount of processing resources used by the computing device during a predetermined period (e.g., day). The method 900, or portions thereof, may improve the functionality of a computer network system (e.g., such as the computing network system 200 shown in FIG. 2) associated with engagement of the user. In addition, the method 900, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 900, or portions thereof, may be combined with the method 300, the method 400, the method 500, and/or the method 600.

The method 900 may start, at 902, when a user performs a transaction. For example, a user may initialize a browser application on a user computing device and may navigate to a URL within the browser application using a browser session. The user may then perform the transaction that is associated with the URL visited during the browser session. Additionally or alternatively, the method 900 may start, at 902, when a computing device receives transaction data.

As illustrated in FIG. 9, a computing device (e.g., such as computing device 210, computing device 230a, 230b, or 230n shown in FIG. 2) may receive, at 904, transaction data. The transaction data may be associated with one or more transactions. For example, the transaction data may be associated with (e.g., include data for) a single transaction performed by a user at a household. In other examples, the transaction data may be associated (e.g., include data for) a plurality of transactions performed by a plurality of users across a plurality of households. The transaction data may include information that is gathered from the transaction(s), such as a sale, a purchase, another event that involves the exchange or modification of data. The transaction data may include a time of the transaction(s), a place of the transaction(s), the item(s) purchased, the payment method, and/or discounts. Additionally or alternatively, the transaction data may include anonymous data (e.g., data that includes no personally identifiable information associated with the user). The anonymous data may include a time, a date, one or more website URLs, a referring URL, a browser type, a language, an IP address, and/or location data.

At 906, the computing device may determine location data associated with the transaction data. For example, the computing device may determine, at 906, an address of a household associated with each of the transactions in the transaction data. The computing device may determine the address of each of the households based on the transaction data. For example, the computing device may determine the address of each of the households using anonymous data received in the transaction data. The address of the household(s) may be a physical address that indicates a postal address at which a respective user performed a respective transaction. For example, the computing device may generate the physical address using a map API (e.g., such as Bing Maps API, Mapbox API, OpenStreetMap API, Leaflet API, OpenLayers API, Google Maps API, and/or another map API). For example, the computing device may translate received latitude and longitude coordinates into the physical address using the map API.

The computing device may determine an address type (e.g., residential, apartment/condo building, single family home, commercial, and/or the like) based on the physical address. For example, the computing device may determine the address type using a postal service API. The computing device may use the address type to determine a type and/or frequency of notifications sent to the user. The computing device may determine other user information based on the physical address such as a name associated with the user(s), an age of the user(s), a gender of the user(s), demographics associated with the user(s), and/or psychographics associated with the user(s). The demographics associated with the user(s) may include race, marital status, household size, occupation, income, education, living status, and/or housing value. The psychographics associated with the user(s) may include personality traits, lifestyles, interests, opinions, beliefs, values, etc.

The computing device may generate a profile for each of the users, for example, using the transaction data, a unique identifier, location data (e.g., one or more addresses), and/or other information. The user profile(s) may be used to track a plurality of factors associated with the user(s) and the users' activity. For example, the user profile(s) may track the transactions each of the users perform, the items each of the users purchase, URLs each of the users access, the frequency with which each of the users access the URL(s), demographics associated with each of the users, the address(es) associated with each of the users, etc. For example, the computing device may associate multiple transactions having the same location data with the same user profile. The user profile(s) may enable generation of a targeted marketing campaign, quantification of each user's interest in one or more products/brands, identify similar products that each of the users may be interested in, and/or tracking health of one or more vehicles owned/operated by each of the users.

At 908, the computing device may determine whether resident density data associated with the household(s) is available. For example, the computing device may determine, at 908, whether the resident density data for the household(s) is stored (e.g., stored in a household database such as household shard 700 shown in FIG. 7 and/or household shards 810, 820, 830, 840 shown in FIG. 8). The resident density data may represent a resident density of each of the households. The resident density data may be a measure of the number of shoppers in a respective household. For example, the resident density data may be determined as a ratio of shoppers to bedrooms in the respective household. The computing device may use the resident density data to perform a density analysis. The density analysis may be associated with an area, for example, such as a zip code, a neighborhood, a street, and/or a building. The density analysis may determine how many shoppers (e.g., active shoppers) are within the area. The density analysis may be performed and/or updated after each transaction, for example, to identify resident density trends. For example, the density analysis may identify density lift over time (e.g., an increase in shoppers over a predetermined time range). The density analysis may be used in behavior assessment, advertisement performance, campaign performance, probability analyses, attribution of advertisement, conversion rates, return on investment (e.g., return on advertisement spend), campaign optimization, audience segmentation, cost per acquisition, and/or the like.

When the computing device determines that resident density data associated with the household is available, the computing device may identify, at 912, a user associated with the transaction. For example, the computing device may identify, at 912, each of the users associated with each of the transactions.

When the computing device determines that resident density data associated with the household is not available, the computing device may generate (e.g., and store), at 910, resident density data for the household using the transaction data. For example, the computing device may initiate and/or create household shards (e.g., such as household shard 700 shown in FIG. 7 and/or household shards 810, 820, 830, 840 shown in FIG. 8) to generate and/or store the resident density data. For example, the computing device may initiate a household shard for each household in the transaction data. The household shards may enable parallel processing through horizontal warehouse scaling. For example, the household shards may distribute the computing load to enable parallel processing of the resident density data, improve performance and/or reduce processing time. The computing device may attribute (e.g., at 910) the transactions to specific households (e.g., first transaction data to a first household and second transaction data to a second household) using a multi-dwelling learning algorithm. For example, the multi-dwelling learning algorithm may be configured to attribute and/or identify density related to clustered residents and/or customers. The multi-dwelling learning algorithm may be a machine learning model that is trained using the transaction data associated with the transactions and/or the resident density data. The multi-dwelling learning algorithm may enable time-sensitive household activity recognition, for example, to understand and interpret household activity over time related to the transactions. When the resident density data for the household has been generated and/or stored, the method may proceed to 912.

At 914, the computing device may determine whether the user is included in the resident density data for the household. For example, the computing device may check for the user in the stored resident density data for the household. When the user is included in the resident density data, the method may end, at 918.

When the user is not included in the resident density data, the computing device may update, at 916, the resident density data to include the user. The method may end, at 918.

Figure 10:
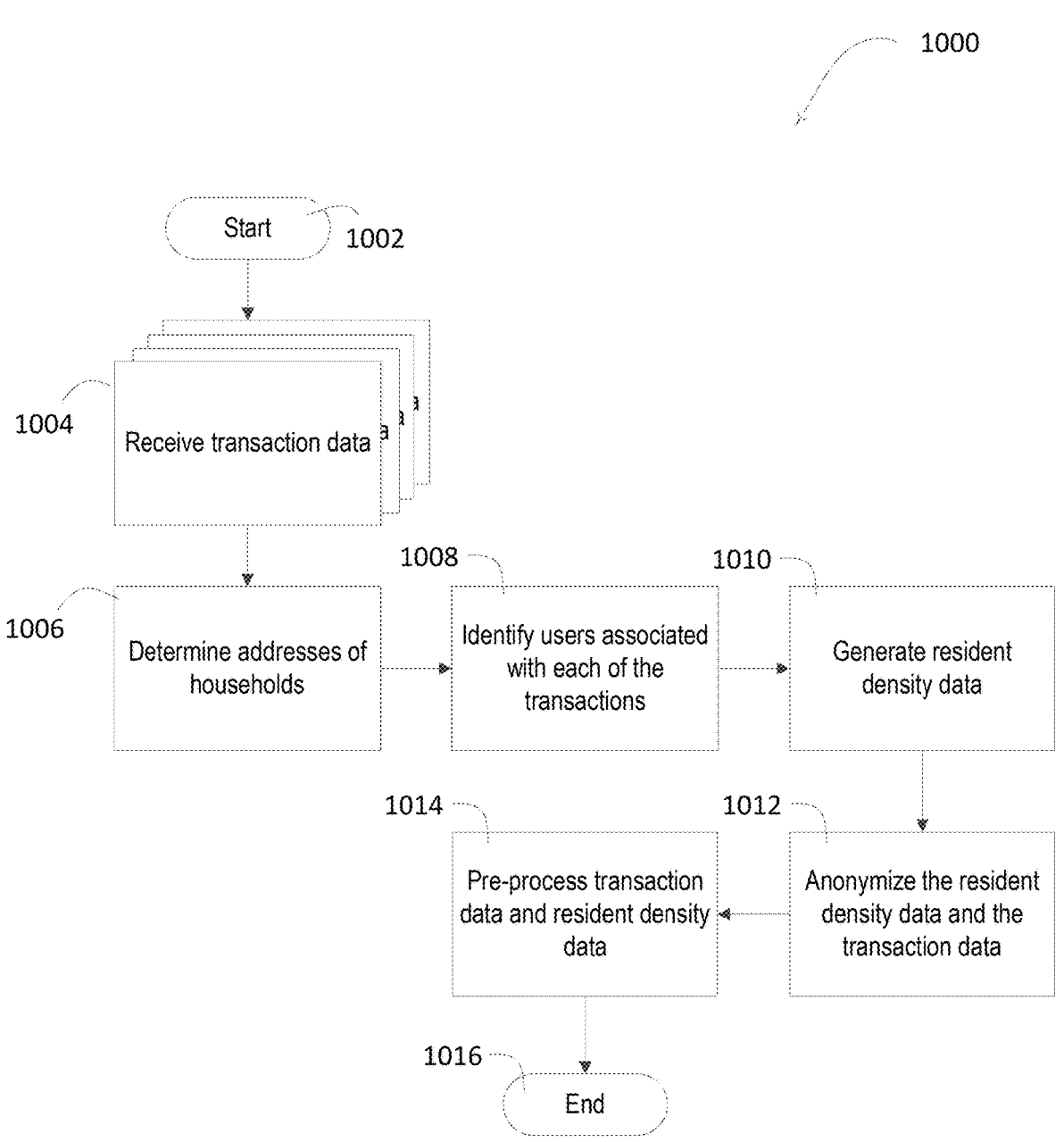
FIG. 10 is a flow diagram illustrating an example method for pre-processing transaction data and resident density data for analysis.

FIG. 10 is a flow diagram of an example method 1000 that may be implemented by one or more computing devices (e.g., such as the computing device 210 and/or the computing devices 230a-230n shown in FIG. 2) to pre-process transaction data and resident density data for analysis. The transaction data may be associated with a plurality of transactions of a plurality of products or services. For example, the transactions may include purchasing, leasing, or renting the product. The products may be a vehicle. The method 1000, or portions thereof, may be performed to enable determination of location data associated with the transaction data. For example, location data may be determined for each of the households based on the transaction data. The method 1000, or portions thereof, may be performed at a single computing device or may be distributed across multiple computing devices (e.g., multiple servers and/or a user device). The method 1000, or portions thereof, may be performed to enable users, such as administrative users, to perform analyses on the transaction data. The method 1000, or portions thereof, may be performed to enable one or more administrative users to pre-process the transaction data and resident density data.

The method 1000 may comprise instructions that may be stored in memory as computer-readable or machine-readable storage media that may be executed by the one or more computing devices for executing the method 1000. The method 1000, or portions thereof, may be performed using parallel processing to reduce the amount of processing resources used by the computing device during a predetermined period (e.g., day). The method 1000, or portions thereof, may reduce processing time and the amount of processing resources used by the computing device during a predetermined period (e.g., day). The method 1000, or portions thereof, may improve the functionality of a computer network system (e.g., such as the computing network system 200 shown in FIG. 2) associated with engagement of the user. In addition, the method 1000, or portions thereof, may implement a distributed network architecture, as shown in FIG. 2, which may reduce the amount of signaling between a user computing device and one or more administrative computing devices (e.g., such as the computing devices 230a, 230b, 230n shown in FIG. 2) and may reduce the amount of processing resources consumed by the administrative computing device(s). The method 1000, or portions thereof, may be combined with the method 300, the method 400, the method 500, the method 600, and/or the method 900.

The method 1000 may start, at 1002, when the computing device receives transaction data. For example, the computing device may receive, at 1004, transaction data associated with a plurality of transactions performed by a plurality of users at a plurality of households. The transaction data may include information that is gathered from the transactions, such as sales, purchases, and/or other events that involve the exchange or modification of data. The transaction data may include respective times of the transactions, location data for each of the transactions, respective uniform resource locators (URLs) associated with the each of the transactions, the items purchased, respective payment methods associated with each of the transactions, and/or anonymous data associated with each of the transactions. The anonymous data may include a time, a date, one or more website URLs, a referring URL, a browser type, a language, an IP address, and/or location data.

At 1006, the computing device may determine an address for each of the households based on the transaction data using a map API. For example, the computing device may determine the address of each of the households using anonymous data received in the transaction data. The addresses of the households may be physical addresses that indicate postal addresses at which the respective users performed the respective transactions. For example, the computing device may generate the physical address using the map API (e.g., such as Bing Maps API, Mapbox API, OpenStreetMap API, Leaflet API, OpenLayers API, Google Maps API, and/or another map API). For example, the computing device may translate received latitude and longitude coordinates into the physical address using the map API. The computing device may determine address types (e.g., residential, apartment/condo building, single family home, commercial, and/or the like) based on the physical addresses. For example, the computing device may determine the address types using a postal service API. The computing device may use the address types to determine a type and/or frequency of notifications sent to the users.

At 1008, the computing device may identify users associated with each of the transactions. For example, the computing device may determine which user performed each of the specific transactions by examining the transaction data. The computing device may determine other user information based on the physical addresses such as names associated with the users, ages of the users, genders of the users, demographics associated with the users, and/or psychographics associated with the users. The demographics associated with the users may include race, marital status, household size, occupation, income, education, living status, and/or housing value. The psychographics associated with the users may include personality traits, lifestyles, interests, opinions, beliefs, values, etc.

The computing device may generate profiles for each of the users, for example, using the transaction data, a unique identifier, location data (e.g., one or more addresses), and/or other information. The user profiles may be used to track a plurality of factors associated with the users and the users' activity. For example, the user profiles may track the transactions each of the users perform, the items each of the users purchase, URLs each of the users access, the frequency with which each of the users access the URL(s), demographics associated with each of the users, the addresses associated with each of the users, etc. For example, the computing device may associate multiple transactions having the same location data with the same user profile. The user profiles may enable generation of a targeted marketing campaign, quantification of each user's interest in one or more products/brands, identify similar products that each of the users may be interested in, and/or tracking health of one or more vehicles owned/operated by each of the users.

At 1010, the computing device may generate resident density data for each of the households using the identified users and the transaction data. For example, the computing device may use respective household shards (e.g., such as household shard 700 shown in FIG. 7 and/or household shards 810, 820, 830, 840 shown in FIG. 8) for each of the households to generate and store resident density data for the households. Each of the household shards may be executed on the computing device or the household shards may be executed on various computing devices, for example, to distribute the processing of the transaction data.

At 1012, the computing device may anonymize the resident density data and the transaction data to remove any PII. For example, the computing device may identify any PII in the resident density data and the transaction data. The computing device may delete PII values, suppress PII values, and/or change PII values to anonymous values.

At 1014, the computing device may pre-process the anonymized transaction data and the anonymized resident density data for analysis. For example, the computing device may store outputs of the household shards in a supervised pre-flight staging area. For example, the computing device may store the anonymized transaction data and/or the anonymized resident density data in separate tables. For example, the computing device may pre-aggregate the outputs to reduce the amount of data stored and enable more efficient data retrieval. The computing device may prep the outputs of the household shards for various specialized post-processing data analytics and data science. For example, the computing device may prep the outputs for user behavior assessment, advertisement performance, campaign performance, probability analyses, attribution of advertisement, conversion rates, return on investment (e.g., return on advertisement spend), campaign optimization, audience segmentation, cost per acquisition, and/or the like.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:

receiving first transaction data associated with a first plurality of transactions, wherein each of the plurality of first transactions was performed via a browser session initialized by a user via a respective browser on a user computing device, wherein the first transaction data comprises one or more of a time of each of the plurality of first transactions, first location data, a uniform resource locator (URL) associated with each of the plurality of first transactions, one or more items purchased, a payment method associated with each of the first plurality of transactions, or anonymous data associated with each of the plurality of first transactions;

determining a first latitude coordinate and a first longitude coordinate of each respective user computing device when each of the plurality of first transactions was performed, wherein the first latitude coordinate and first longitude coordinate are determined based on the anonymous data upon determining that the respective user opted-out of location tracking, or wherein the first latitude coordinate and the first longitude coordinate are determined based on geo-location data retrieved from the respective user computing device upon determining that the respective user opted-in to location tracking;

determining addresses of each household of each respective user based on the first latitude coordinate and the first longitude coordinate using a map application programming interface (API);

determining that resident density data associated with one or more households is not available in a household database;

upon determining that resident density data for the one or more households is not available, initiating a household computing shard for each of the one or more households;

determining, using the respective initiated household computing shards, resident density data for each of the one or more households at the determined addresses based on the first transaction data by determining a ratio of shoppers to bedrooms in each of the one or more households, wherein the resident density data is a measure of a number of shoppers in a respective household;

identifying each of the users associated with each of the plurality of first transactions;

determining that a first identified user is included in the resident density data when the first identified user is in the household database;

determining that a second identified user is not included in the resident density data when the second identified user is not in the household database;

updating the resident density data to include each identified user not included in the resident density data; and pre-processing the first transaction data and the resident density data to determine filtering criteria for a campaign.

2. The method of claim 1, further comprising anonymizing the resident density data to remove any personally identifiable information (PII).

3. The method of claim 1, further comprising determining whether resident density data for a household of the one or more households is available.

4. The method of claim 1, wherein the anonymous data comprises one or more of the time of a first transaction of the plurality of transactions, a date of the first transaction, the URL associated with the first transaction, a referring URL, a browser type, a language, an internet protocol (IP) address, or the first location data.

5. The method of claim 1, wherein the resident density data is determined using parallel processing through horizontal warehouse scaling.

6. The method of claim 1, further comprising attributing the first transaction data to one or more households using a multi-dwelling learning algorithm.

7. The method of claim 1, further comprising updating the resident density data upon determining that a user in household performed a transaction.

8. A non-transitory, machine-readable storage device that includes instructions that, when executed by a computing device, cause the computing device to:

receive first transaction data associated with a first plurality of transactions, wherein each of the plurality of first transactions was performed via a browser session initialized by a user via a respective browser on a user computing device, wherein the first transaction data comprises one or more of a time of each of the plurality of first transactions, first location data, a uniform resource locator (URL) associated with each of the plurality of first transactions, one or more items purchased, a payment method associated with each of the first plurality of transactions, or anonymous data associated with each of the plurality of first transactions;

determine a first latitude coordinate and a first longitude coordinate of each respective user computing device when each of the plurality of first transactions was performed, wherein the first latitude coordinate and first longitude coordinate are determined based on the anonymous data upon determining that the respective user opted-out of location tracking, or wherein the first latitude coordinate and the first longitude coordinate are determined based on geo-location data retrieved from the respective user computing device upon determining that the respective user opted-in to location tracking;

determine addresses of each household of each respective user based on the first latitude coordinate and the first longitude coordinate using a map application programming interface (API);

determine that resident density data associated with one or more households is not available in a household database;

upon determining that resident density data for the one or more households is not available, initiate a household computing shard for each of the one or more households;

determine, using the respective initiated household computing shards, resident density data for each of the one or more households at the determined addresses based on the first transaction data by determining a ratio of shoppers to bedrooms in each of the one or more households, wherein the resident density data is a measure of a number of shoppers in a respective household;

identify each of the users associated with each of the plurality of first transactions;

determine that a first identified user is included in the resident density data when the first identified user is in the household database;

determine that a second identified user is not included in the resident density data when the second identified user is not in the household database;

update the resident density data to include each identified user not included in the resident density data; and pre-process the first transaction data and the resident density data to determine filtering criteria for a campaign.

9. The non-transitory, machine-readable storage device of claim 8, wherein the instructions, when executed by the computing device, cause the computing device to anonymize the resident density data to remove any personally identifiable information (PII).

10. The non-transitory, machine-readable storage device of claim 8, wherein the instructions, when executed by the computing device, cause the computing device to determine whether resident density data for a household of the one or more households is available.

11. The non-transitory, machine-readable storage device of claim 8, wherein the anonymous data comprises one or more of the time of a first transaction of the plurality of transactions, a date of the first transaction, the URL associated with the first transaction, a referring URL, a browser type, a language, an internet protocol (IP) address, or the first location data.

12. The non-transitory, machine-readable storage device of claim 8, wherein the resident density data is determined using parallel processing through horizontal warehouse scaling.

13. The non-transitory, machine-readable storage device of claim 8, wherein the instructions, when executed by the computing device, cause the computing device to attribute the first transaction data to the one or more households using a multi-dwelling learning algorithm.

14. The non-transitory, machine-readable storage device of claim 8, wherein the instructions, when executed by the computing device, cause the computing device to update the resident density data upon determining that a user in the household performed a transaction.

15. A method comprising:

receiving transaction data associated with a plurality of transactions performed by a plurality of users at a plurality of households, wherein the transaction data comprises one or more of respective times of the plurality of transactions, location data for each of plurality of the transactions, respective uniform resource locators (URLs) associated with the each of the plurality of transactions, items purchased, respective payment methods associated with each of the plurality of transactions, or anonymous data associated with each of the plurality of transactions;

determining an address for each of the households based on the transaction data using a map application programming interface (API);

identifying users associated with each of the plurality of transactions;

determining that resident density data associated with one or more of the households is not available in a household database;

generating, using respective household shards for each of the one or more households, resident density data for each of the one or more households using the identified users and the transaction data by determining a ratio of shoppers to bedrooms in each of the one or more households, wherein the resident density data is a measure of a number of shoppers in the respective household;

anonymizing the resident density data and the transaction data to remove any personally identifiable information (PII); and pre-processing the anonymized transaction data and the anonymized resident density data for analysis.

16. The method of claim 15, further comprising determining a latitude coordinate and a longitude coordinate of each of the plurality of users, wherein the latitude coordinates and the longitude coordinates are determined based on the anonymous data associated with each of the plurality of transactions upon determining that the respective user opted-out of location tracking, or wherein the latitude coordinate and the longitude coordinate are determined based on geolocation data retrieved from the respective user computing device upon determining that the respective user opted-in to location tracking.

* * * * *